United States Patent
Hug

(10) Patent No.: US 12,073,661 B2
(45) Date of Patent: Aug. 27, 2024

(54) METHOD FOR OPERATING A LOCAL NETWORK BY A MOTOR VEHICLE AS A FUNCTION OF A STATE OF CHARGE OF AN ELECTRICAL ENERGY STORAGE UNIT, AND SYSTEM

(71) Applicant: DAIMLER AG, Stuttgart (DE)

(72) Inventor: Tobias Hug, Magstadt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 297 days.

(21) Appl. No.: 17/627,184

(22) PCT Filed: Jul. 13, 2020

(86) PCT No.: PCT/EP2020/069725
§ 371 (c)(1),
(2) Date: Jan. 14, 2022

(87) PCT Pub. No.: WO2021/009106
PCT Pub. Date: Jan. 21, 2021

(65) Prior Publication Data
US 2022/0358795 A1 Nov. 10, 2022

(30) Foreign Application Priority Data
Jul. 17, 2019 (DE) ...................... 10 2019 005 006.1

(51) Int. Cl.
*G07C 5/00* (2006.01)
*G07C 5/08* (2006.01)

(52) U.S. Cl.
CPC ........... *G07C 5/008* (2013.01); *G07C 5/0816* (2013.01); *G07C 5/0841* (2013.01)

(58) Field of Classification Search
None
See application file for complete search history.

(56) References Cited

U.S. PATENT DOCUMENTS

| | | |
|---|---|---|
| 9,439,121 B2 | 9/2016 | Sargento et al. |
| 10,383,156 B2 | 8/2019 | Horbatt |

(Continued)

FOREIGN PATENT DOCUMENTS

| | | | |
|---|---|---|---|
| CN | 103873595 A | 6/2014 | |
| CN | 104185309 A | 12/2014 | |

(Continued)

OTHER PUBLICATIONS

International Search Report mailed Nov. 20, 2020 in related/corresponding International Application No. PCT/EP2020/069725.

(Continued)

*Primary Examiner* — Jelani A Smith
*Assistant Examiner* — Davin Seol
(74) *Attorney, Agent, or Firm* — PATENT PORTFOLIO BUILDERS PLLC

(57) ABSTRACT

A method for operating a local network for a terminal device by a first communication device of a first motor vehicle is provided. A first mobile network connection is set up between the first motor vehicle and a network external to the motor vehicle Using the first communication device. The local network is created for the terminal device as a function of the first mobile network connection. A current first state of charge of a first electrical energy storage unit of the first motor vehicle is determined by the first communication device and the local network is created as a function of the determined first state of charge that is determined.

6 Claims, 2 Drawing Sheets

(56) References Cited

U.S. PATENT DOCUMENTS

Figure 1:
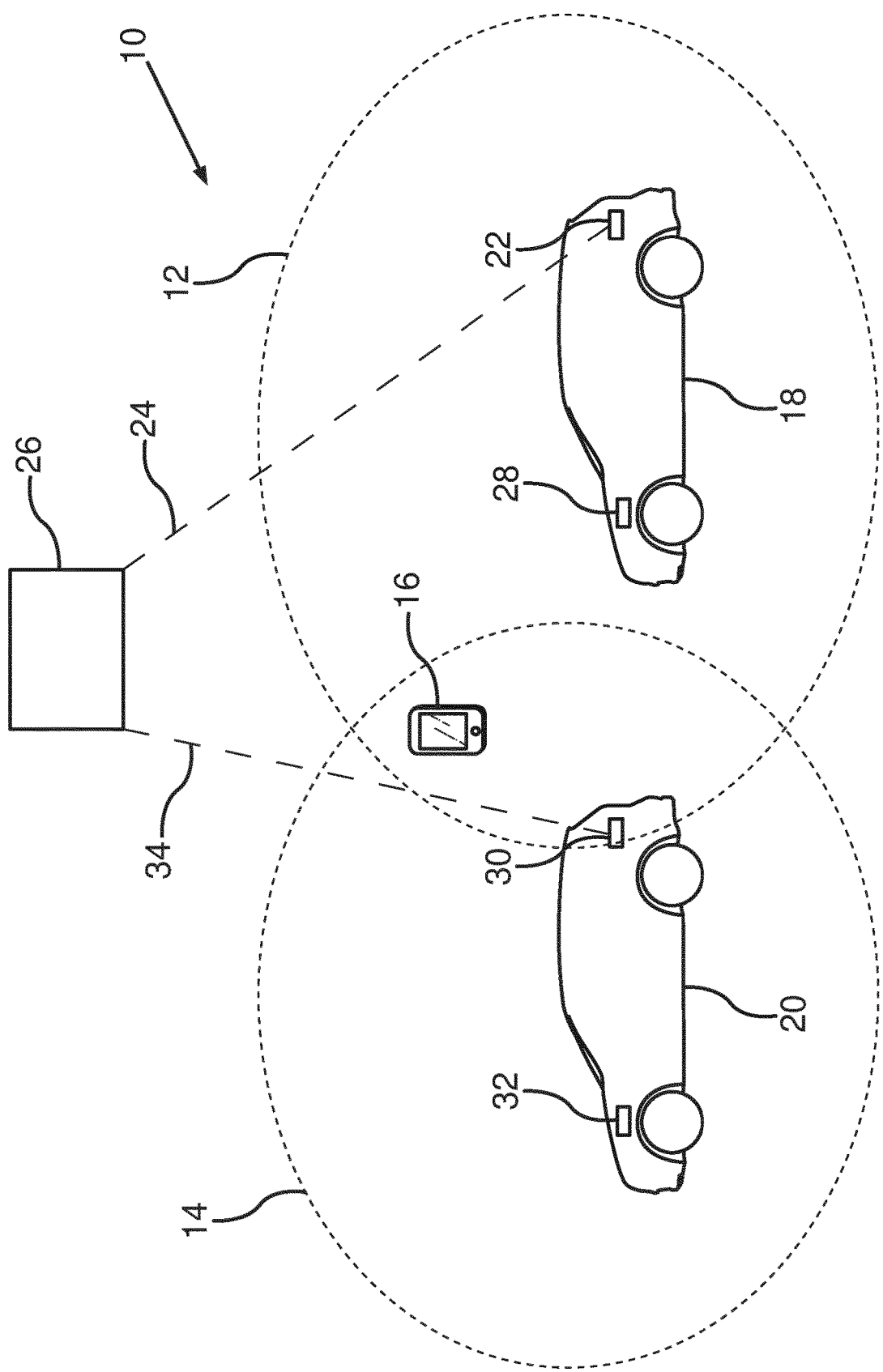

| | | |
|---|---|---|
| 2005/0148334 A1 | 7/2005 | Peeters |
| 2014/0269466 A1 | 9/2014 | Owens et al. |
| 2016/0057635 A1 | 2/2016 | Liu et al. |
| 2017/0150531 A1* | 5/2017 | Horbatt ................. H04W 24/02 |
| 2019/0037500 A1* | 1/2019 | Kwoczek .......... H04W 52/0254 |
| 2022/0203867 A1* | 6/2022 | Dany .................. H01M 8/0432 |

FOREIGN PATENT DOCUMENTS

| | | |
|---|---|---|
| CN | 108528369 A | 9/2018 |
| DE | 102016121384 A1 | 5/2017 |
| JP | 2006196934 A | 7/2006 |
| WO | 2015120753 A1 | 8/2015 |
| WO | 2018107626 A1 | 6/2018 |

OTHER PUBLICATIONS

Office Action created Mar. 11, 2020 in related/corresponding DE Application No. 10 2019 005 006.1.

Written Opinion mailed Nov. 20, 2020 in related/corresponding International Application No. PCT/EP2020/069725.

Office Action created Dec. 26, 2023 in related/corresponding CN Application No. 202080050928-4.

* cited by examiner

METHOD FOR OPERATING A LOCAL NETWORK BY A MOTOR VEHICLE AS A FUNCTION OF A STATE OF CHARGE OF AN ELECTRICAL ENERGY STORAGE UNIT, AND SYSTEM

BACKGROUND AND SUMMARY OF THE INVENTION

In a first aspect, exemplary embodiments of the invention relate to a method for operating a local network for at least one terminal device by means of a first communication device of a first motor vehicle, in which, by means of the first communication device, a first mobile network connection is established between the first motor vehicle and a network external to the motor vehicle and in which, as a function of the first mobile network connection, the local network is created for the at least one terminal device.

A further aspect of exemplary embodiments of the invention relate to a method for operating a local network for at least one terminal device by means of at least one first communication device of a first motor vehicle or at least one second communication device of a second motor vehicle, in which, by means of the first communication device, a first mobile network connection is established between the first motor vehicle and a network external to the motor vehicle, and by means of the second communication device, a second mobile network connection is established between the second motor vehicle and the network external to the motor vehicle, wherein the local network is created by the first communication device or by the second communication device.

Yet another aspect of exemplary embodiments of the invention relate to a system for creating a local network.

Nowadays it is particularly important to be able to establish a corresponding data link with, for example, the Internet over a large area. For this purpose, it is known that in urban districts, increasingly so-called public hot spots are available, which for example are provided by businesses. However, there are also regions in which there is no provision of hot spots, for example even in urban residential areas or in country areas. At present, freely available hot spots are not or are only rarely present there. Further expansion for networking of the most varied technical equipment (IoT—Internet of Things) also requires the greatest possible area coverage of access to the Internet, which is not provided today.

U.S. Pat. No. 9,439,121 B2 discloses a wireless network data router for a vehicle and a method of operation thereof, comprising a multiple connection interface for wireless access in vehicle surroundings, a wireless local network, such as can in particular be configured as Wi-Fi, a mobile dedicated data interface, a downlink data connection for the motor vehicle and/or the user in the motor vehicle and in its surroundings, a data processing unit for routing data between the interfaces, wherein the data processing unit is configured for calculating a score for each attainable network, and for switching the uplink connection of the router of the wireless network to the attainable network with the best score. In addition, a wireless network data router for vehicles for connecting vehicles to the Internet via a multi-network device is disclosed, wherein the router is a mobile router, which is suitable for forming a net of connected vehicles, wherein the router is arranged for using parked vehicles for redistributing Wi-Fi signals from fixed hot spots.

DE 10 2016 121 384 A1 discloses a system and method for setting up a mobile hot spot in the vicinity of a vehicle. The system comprises the use of a vehicle that comprises a battery and a charging connection, wherein the charging connection connects the vehicle to an external energy source and is connected electrically to the battery, in order to supply the battery, when connected, with electric current from the external energy source; and a wireless access point, which is operated by the battery in the vehicle and provides wireless Internet access for one or more wireless devices located in or in the vicinity of the vehicle; and a control unit, which makes operation of the access point possible while the vehicle is switched off and is connected via the charging connection to the external energy source.

US 2005/0 148 334 A1 describes a method and device for improving a network. The network uses the energy from a vehicle battery or a vehicle generator in order to operate a relay transmitter unit, which receives the signal from a portable wireless device and relays the data in the signal to a base station. The relay transmitter unit also receives data from the base station and forwards the data to the portable wireless device. The system described expands the regions in which a wireless device can be used.

US 2014/0 269 466 A1 describes a method for controlling a Wi-Fi service provided by a vehicle, comprising detecting, on the vehicle, that an ignition switch of the vehicle is switched off; the wireless reception of a message on the vehicle, which controls the operation of the Wi-Fi service while the vehicle's ignition switch is switched off; and the activation or deactivation of the Wi-Fi service provided by the vehicle as a reaction to the wirelessly received message, while the vehicle's ignition switch is switched off.

Exemplary embodiments of the present invention are directed to methods for operating a local network and a system, by means of which an improved local network can be produced for at least one terminal device.

A first aspect of the invention relates to a method for operating a local network for at least one terminal device by means of a first communication device of a first motor vehicle, in which, by means of the first communication device, a first mobile network connection is established between the first motor vehicle and a network external to the motor vehicle, and in which the local network is created for the at least one terminal device as a function of the first mobile network connection.

It is provided that by means of the first communication device, a current first state of charge of a first electrical energy storage unit of the first motor vehicle is determined and at least the local network is created as a function of the first state of charge that is determined.

This makes it possible for the local network to be created as a function of the state of charge of the electrical energy storage unit. In other words, it is provided that if the state of charge of the electrical energy storage unit is correspondingly high, the local network is set up by means of the communication device. If the state of charge of the electrical energy storage unit is correspondingly low, the local network is not set up. In particular, this prevents excessive discharge of the electrical energy storage unit of the motor vehicle, so that, for example, driving is no longer possible, wherein simultaneously the local network, which is in particular a wireless local network, in particular a Wi-Fi network, can be set up, to increase full-coverage access for terminal devices in the local network. In other words, a hot spot for the at least one terminal device can be provided by means of the first communication device as a function of the state of charge of the electrical energy storage unit.

It is further provided that, depending on the first state of charge determined of the first electrical energy storage unit, a first provisioning forecast is generated for the creation of the local network by means of the first communication device. In other words, it is provided that a corresponding forecast is performed as a function of the electrical energy still available in the electrical energy storage unit. In particular, a time interval is forecast, for which a hot spot function, i.e., provision of the local network, can be offered or maintained. The determination is performed based on a current energy requirement. This makes it possible for the local network to be created reliably for the at least one terminal device.

Furthermore, a current first energy requirement is determined and stored in a first storage device of the first communication device and as a function of a plurality of stored first energy requirements, an average first energy requirement is determined, wherein the first provisioning forecast is produced as a function of the average first energy requirement. In particular, determination of the provisioning forecast thus takes place based on the average energy requirement needed in order to maintain a hot spot. The function for determining the average energy requirement for maintenance of a hot spot always runs in the background of production of the hot spot function. The value for the average energy requirement is therefore constantly updated and adapted, in order to achieve a high forecasting quality. This makes it possible for the local network to be set up reliably.

For this purpose, it is preferably provided that the communication device has an electronic computing device, by means of which both the communication with the network external to the motor vehicle can be controlled and the state of charge of the electrical energy storage unit can be verified. For this purpose, for example by means of a detecting device of the electrical energy storage unit, a corresponding state-of-charge signal can be sent to the electronic computing device, so that the electronic computing device can determine the current state of charge of the electrical energy storage unit reliably.

In particular, the invention takes advantage of the fact that motor vehicles as a rule have the corresponding communication device factory-installed, which has a connection of the motor vehicle to the network external to the motor vehicle, which for example may be configured as back-end, and thereby makes connection to the Internet possible. It is now proposed to utilize this available technology in order to expand the availability of hot spots that make access to the Internet possible for the terminal devices. In particular, a connection to the Internet becomes possible for any communication partners, i.e., the terminal devices. This is important, in particular, for the ever expanding networking of any devices via the Internet, the so-called IoT (Internet of Things). The higher the density of the corresponding motor vehicles with this communication device, the higher is the coverage with the corresponding hot spots.

According to an advantageous embodiment, the local network is created in a parked state of the first motor vehicle. In particular, it is possible to check beforehand whether the motor vehicle meets the basic requirements for the production of a hot spot. Moreover, especially preferably, a parked motor vehicle is used for the method, as for this purpose the local network can be provided stably within the surroundings for the at least one terminal device.

Moreover, it has proved advantageous if the local network is produced as a function of a first connection quality of the first mobile network connection determined by means of the first communication device. In other words, checking takes place, as to whether a communication device on the connection side exists with the network external to the motor vehicle, thus a back-end part or the Internet, and whether the connection quality is sufficient to create the local network for the terminal device. This makes it possible for a corresponding quality to be achieved for creating the hot spot for the terminal device.

Moreover, it has proved advantageous if the local network is created as a function of a first ignition state of the first motor vehicle, determined by means of the first communication device. In other words, it is in particular verified whether the motor vehicle is switched off and, in particular, is parked and is therefore in a state of rest. It is thereby possible to ensure that the local network can also provide the local network over a corresponding time interval in the local region.

In a further advantageous embodiment, the local network is created for a plurality of terminal devices. In other words, a plurality of terminal devices, for example mobile phones, in particular smartphones, or tablets or computers, can connect to the local network. Thus, a hot spot for the plurality of terminal devices can be provided by the local network. This makes it possible, in particular, to connect the terminal devices to the Internet. Especially in areas in which only a poor connection is made possible by means of the terminal device, an advantageous connection to the Internet can thus be produced for this terminal device. Moreover, the hot spot function can be expanded thereby for the plurality of terminal devices.

A second aspect of the invention relates to a method for operating a local network for at least one terminal device by means of at least one first communication device of a first motor vehicle or at least one second communication device of a second motor vehicle, in which, by means of the first communication device, a first mobile network connection is established between the first motor vehicle and a network external to the motor vehicle and by means of the second communication device, a second mobile network connection is established between the second motor vehicle and the network external to the motor vehicle, wherein the local network is created by the first communication device or by the second communication device.

It is provided that communication is provided between the first communication device and the second communication device by means of a local network and it is decided, as a function of a first state of charge of a first electrical energy storage unit of the first motor vehicle and a second state of charge of a second electrical energy storage unit determined by means of the respective communication devices, by means of which communication devices the local network is created for the at least one terminal device.

Therefore, if a plurality of motor vehicles, in particular in this case the first motor vehicle and the second motor vehicle, have a corresponding hot spot function, then, for example, also in a residential area, in which motor vehicles are parked for some hours, a basic service is always provided. The motor vehicles with the hot spot function can also communicate with one another over a local network, in particular by means of a WLAN connection. This makes it possible to be careful with the energy reserves of the respective electrical energy storage units of the respective motor vehicles. If, for example, the first motor vehicle and the second motor vehicle with the hot spot function are located in a confined space, the particular motor vehicle with the smallest energy reserve can protect its on-board power supply, for example by not setting up a hot spot function. This may improve the creation of a local network for the at least one terminal device.

Alternatively, or additionally, it may, for example, be provided that local networks are first created by means of the first communication device and when a threshold value of the first state of charge of the first electrical energy storage unit is reached, it is decided that the local network is created by means of the second communication device. The threshold value may, for example, be selected in such a way that reliable driving of the first motor vehicle can continue.

According to an advantageous embodiment of this method, the local network of the other motor vehicle is not created until the motor vehicle that is first to create the local network has reached a predetermined state of charge of the respective electrical energy storage unit or this motor vehicle has left predetermined surroundings for the local network.

In other words, it is provided that only when the motor vehicle leaves the region or the on-board power supply or the available energy reserve is exhausted, the local network is set up by the other motor vehicle. Through the networking of the motor vehicles, an intelligent data network is thus set up, which makes efficient hot spot provision possible, with the greatest possible area coverage.

Yet another aspect of the invention relates to a system for creating a local network for a terminal device, wherein the system is configured for carrying out a method according to the first aspect and/or for carrying out a method according to the second aspect. In particular, the method according to the first aspect and/or according to the second aspect is carried out by means of the system.

Advantageous embodiments of the methods are to be regarded as advantageous embodiments of the system. The system has concrete features for this, which make it possible for the method to be carried out according to the first aspect and/or according to the second aspect.

Further advantages, features and details of the invention can be seen from the following description of preferred embodiment examples and from the drawings. The features and combinations of features mentioned above and in the description and the features and combinations of features stated in the description of the figures and/or only shown in the single figure are usable not only in the combination given in each case, but also in other combinations or when used alone, while remaining within the scope of the invention.

BRIEF DESCRIPTION OF THE DRAWING FIGURES

The figures show:
FIG. 1 a schematic top view of an embodiment of a system; and
FIG. 2 a schematic flowchart of an embodiment of a method.

In the figures, identical or functionally equivalent elements have been given the same reference symbol.

DETAILED DESCRIPTION

FIG. 1 shows a schematic side view of an embodiment of a system 10. The system 10 is configured for creating a local network 12, 14 for a terminal device 16. In the following, a method is described, which is carried out for operating the local network 12. These details apply to the local network 14 similarly. The local network 12 is created by a first motor vehicle 18, and the local network 14 is created by a second motor vehicle 20.

In the method for creating the local network 12 for the at least one terminal device 16 by means of a first communication device 22 of the first motor vehicle 18, a first mobile network connection 24 is set up between the first motor vehicle 18 and the network external to the motor vehicle 26 by means of the first communication device 22, and the local network 12 is created as a function of the first mobile network connection 24.

It is provided that, by means of the first communication device 22, a current state of charge of a first electrical energy storage unit 28 of the first motor vehicle 18 is determined and at least the local network 12 is created as a function of the first state of charge that is determined.

In particular, it may be provided that the local network 12 is created for a plurality of terminal devices 16.

As mentioned above, the local network 14 can be created similarly by the second motor vehicle 20. For this purpose, the second motor vehicle 20 has, in particular, a second communication device 30. Furthermore, the second motor vehicle 20 has a second electrical energy storage unit 32. In particular, the aforementioned method can then be applied similarly, wherein a second mobile network connection 34 is set up between the second communication device 30 and the network external to the motor vehicle 26.

A further aspect of the invention relates to a method for operating the local network 12, 14 for the terminal device 16 by means of at least the first communication device 22 of the first motor vehicle 18 or at least the second communication device 30 of the second motor vehicle 20, in which the first mobile network connection 24 is set up between the first motor vehicle 18 and the network external to the motor vehicle 26 by means of the first communication device 22, and the second mobile network connection 34 is set up between the second motor vehicle 20 and the network external to the motor vehicle 26 by means of the second communication device 30, wherein the local network 12, 14 is created by the first communication device 22 or the second communication device 30.

It is provided that there is communication between the first communication device 22 and the second communication device 30 by means of a local network, and it is decided, as a function of a first state of charge between the first electrical energy storage unit 28 of the first motor vehicle 18 and a second state of charge of the second electrical energy storage unit 32, determined by means of the respective communication devices 22, 30, by means of which communication device 22, 30 the local network 12, 14 is created for the at least one terminal device 16.

In particular, FIG. 1 shows that the local network 12, 14 is created by the other motor vehicle 18, 20 only when the motor vehicle 18, 20, which created the local network 12, 14 first, has reached a predetermined state of charge of the respective energy storage unit 28, 32 and/or this motor vehicle 18, 20 has left predetermined surroundings for the local network 12, 14.

In particular, the invention according to FIG. 1 takes advantage of the fact that motor vehicles 18, 20 as a rule have factory-installed communication devices 22, 30, which can set up a connection of the motor vehicles 18, 20 to the network external to the motor vehicle 26 and thus make connection to the Internet possible. It is now proposed to use this available technology to expand the availability of hot spots that correspond to the local networks 12, 14 and make access to the Internet possible. Moreover, in particular, parked motor vehicles 18, 20 are used as hot spots, via which a connection to the Internet is possible for any communication partners. This is also, in particular, very useful for the ever expanding networking of any terminal devices 16 over the Internet. The higher the density of the parked motor vehicles 18, 20, the higher is the coverage with hot spots.

If, for example, a plurality of motor vehicles 18, 20 have the hot spot function, basic coverage is, for example, also always guaranteed in a residential area in which the motor vehicles 18, 20 are parked for some hours. The motor vehicles 18, 20 with the hot spot function can also communicate with one another over a WLAN connection. It thus becomes possible to achieve a saving of the energy reserves. If, for example, many motor vehicles 18, 20 with a hot spot function are located in a confined space, then the motor vehicle 18, 20 with the smallest energy reserve saves its on-board power supply, for example by not setting up a hot spot function, and only does so if the other motor vehicle 18, 20 must take down its hot spot, because it is leaving the area, or the on-board power supply or the available energy reserve is exhausted. By networking the motor vehicles 18, 20, a smart data network is set up, which makes hot spot provision efficient, with the greatest possible area coverage.

Figure 2:
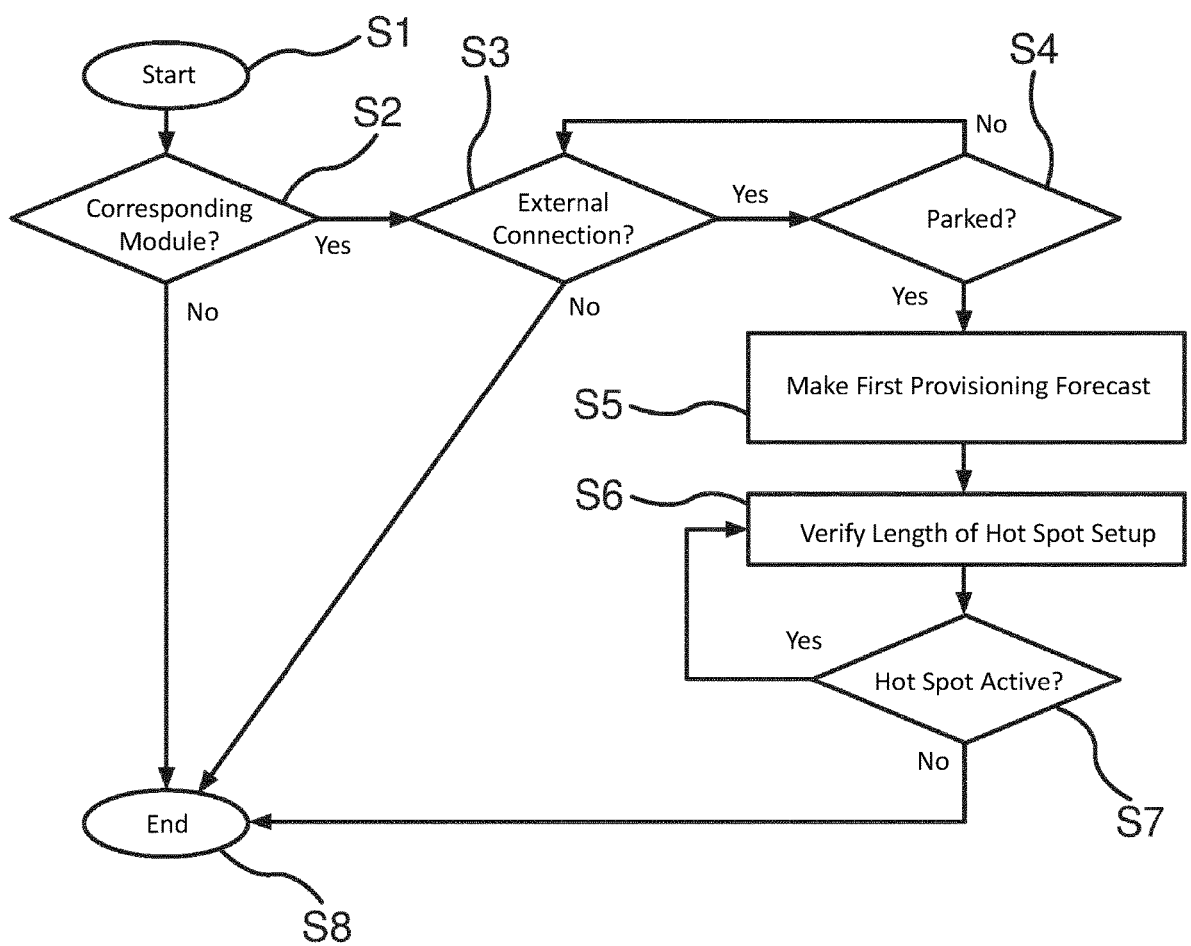

FIG. 2 shows a schematic flowchart of an embodiment of the method. In particular, the method is started in a first step S1. In a second step S2, it is verified whether the respective motor vehicle 18, 20 has a corresponding module, by means of which a local network 12, 14 can be set up. In other words, it is verified whether the motor vehicle 18, 20 meets the basic requirements for providing a hot spot. In a step S3, it is tested whether there is a connection of the communication device 22, 30 to the network external to the motor vehicle 26 or to the Internet. In particular, it is also provided that the local network 12 is created as a function of a first connection quality of the first mobile network connection 24 determined by means of the first communication device 22. In other words, in the third step S3 it is also provided that the connection quality is verified and whether it is adequate. In a fourth step S4 it is then verified whether the motor vehicle 18, 20 is parked and is at rest and in particular the ignition is switched off. In other words, in a fourth step S4 it is provided that the local network 12, 14 is created in a parked state of the first motor vehicle 18, 20. Furthermore, in the fourth step S4 it is provided that the local network 12 is created as a function of a first ignition state of the first motor vehicle 18 determined by means of the first communication device 22. This applies analogously to the second motor vehicle 20.

In a fifth step S5, a first provisioning forecast is made for the creation of the local network 12 by means of the first communication device 22, as a function of the first state of charge that is determined for the first electrical energy storage unit 28. In particular, in the fifth step S5, a current first energy requirement is determined and is stored in a first storage device of the first communication device 22, and as a function of a plurality of stored first energy requirements, an average first energy requirement is determined, wherein the first provisioning forecast is produced as a function of the average first energy requirement. In other words, in the fifth step S5 it is determined whether, in the motor vehicle 18, 20, the electrical energy reserve currently still available in the electrical energy storage unit 28, 32 is sufficient to set up the local network 12, 14. Based on this information, it is possible to forecast the time interval for which a hot spot function can be offered or maintained. The calculation is carried out based on the average energy requirement needed for maintaining a hot spot.

In other words, in a sixth step S6 it is verified how long the WLAN hot spot can be set up or maintained by the motor vehicle 18, 20. In a seventh step S7, it is again verified whether the hot spot is active for the aforementioned time interval. In other words, the function for determining the average energy requirement for maintaining the hot spot is always running in the background during the active hot spot function. The value for the average energy requirement is therefore constantly updated and adapted, to ensure a high forecasting quality. If all tests have now been positive and a valid forecast is available for the hot spot time, the motor vehicle 18, 20 will set up and maintain the hot spot in the sixth step S6. Now, any communication partners, in particular the mobile terminal device 16, can connect to the hot spot and then go onto the Internet. If the time that was reported actively by the hot spot has expired, the hot spot is taken down in a seventh step S7. In addition, the current on-board power supply state in the motor vehicle 18, 20 is always verified in parallel. If the on-board power supply state moves into a critical region, the hot spot function is interrupted immediately, to protect the on-board power supply and ensure starting of the motor vehicle 18, 20. In an eighth step S8, once again the method is ended.

In particular, this description shows that the available technology in the motor vehicles 18, 20 can be used meaningfully and the motor vehicles 18, 20 can also, in particular, be used meaningfully outside of their originally intended application. In particular, the increasing networking of the most varied technical equipment, in particular the terminal devices 16, now offers great opportunities for networking, for example, of the equipment for parking space monitoring, parking meters, or other applications that can set up an Internet connection via the parked motor vehicles 18, 20 in the environment.

In particular, this greatly increases the availability of Internet access in the public space by using widely available systems that are already built into most motor vehicles 18, 20. Furthermore, an appreciable increase in hot spot and Internet access availability is also possible in country areas or in residential areas or wherever there is a large number of parked motor vehicles 18, 20, because as a rule every household has at least one motor vehicle 18, 20. Lastly, a network of hot spots for IoT devices is also set up, which as a rule do not have their own mobile telephony modules.

Overall, the invention describes usage of the motor vehicles 18, 20 for extending a mobile or variable hot spot network for mobile data processing in the public space.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   determining, by a first communication device of a first motor vehicle, a current first state of charge of a first electrical energy storage unit of a first motor vehicle;
   generating a first provisioning forecast of a time interval for which a local network can be offered or maintained by the first communication device by
      determining a current first energy requirement of the first motor vehicle;
      storing, in a first storage device of the first communication device, the determined current first energy requirement; and
      determining, as a function of a plurality of stored first energy requirements that include the determined first energy requirement, an average first energy requirement, wherein the first provisioning forecast is generated as a function of the average first energy requirement;
   establishing a first mobile network connection between the first communication device and a network external to the motor vehicle;
   determining, by the first communication device, whether to create a local network with at least one terminal device based on the determined current first state of charge of the first electrical energy storage unit and the first provisioning forecast; and
   creating, by the first communication device, the local network when it is determined, based on the determined current first state of charge of the first electrical energy storage unit and the first provisioning forecast, to create the local network,
   wherein the at least one terminal device is connected to the network external to the motor vehicle via the local network, the first communication device, and the first mobile network connection.

2. The method of claim 1, wherein the local network is created in a parked state of the first motor vehicle.

3. The method of claim 1, wherein the local network is created as a function of a first connection quality of the first mobile network connection as determined by the first communication device.

4. The method of claim 1, wherein the local network is created as a function of a first ignition state of the first motor vehicle as determined by the first communication device.

5. The method of claim 1, wherein the local network is used by a plurality of terminal devices that include the at least one terminal device.

6. A system, comprising:
   a motor vehicle that includes a communication device and an electrical energy storage unit; and
   at least one terminal device,
   wherein the communication device is configured to
      determine a current first state of charge of a first electrical energy storage unit of a first motor vehicle;
      generate a first provisioning forecast of a time interval for which a local network can be offered or maintained by the first communication device by
         determining a current first energy requirement of the first motor vehicle;
         storing, in a first storage device of the first communication device, the determined current first energy requirement; and
         determining, as a function of a plurality of stored first energy requirements that include the determined first energy requirement, an average first energy requirement, wherein the first provisioning forecast is generated as a function of the average first energy requirement;
      establish a first mobile network connection between the first communication device and a network external to the motor vehicle;
      determine whether to create a local network with at least one terminal device based on the determined current first state of charge of the first electrical energy storage unit and the first provisioning forecast; and
      create the local network when it is determined, based on the determined current first state of charge of the first electrical energy storage unit and the first provisioning forecast, to create the local network,
   wherein the at least one terminal device is connected to the network external to the motor vehicle via the local network, the first communication device, and the first mobile network connection.

* * * * *